US008616567B2

(12) United States Patent
Eguchi et al.

(10) Patent No.: US 8,616,567 B2
(45) Date of Patent: Dec. 31, 2013

(54) VEHICLE SUSPENSION APPARATUS

(75) Inventors: Hiroaki Eguchi, Hiroshima (JP); Masaaki Tanaka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/807,264

(22) PCT Filed: Jun. 24, 2011

(86) PCT No.: PCT/JP2011/003633
§ 371 (c)(1),
(2), (4) Date: Dec. 27, 2012

(87) PCT Pub. No.: WO2012/001934
PCT Pub. Date: Jan. 5, 2012

(65) Prior Publication Data
US 2013/0113176 A1 May 9, 2013

(30) Foreign Application Priority Data
Jun. 30, 2010 (JP) ................................ 2010-150050

(51) Int. Cl.
*B60G 21/055* (2006.01)

(52) U.S. Cl.
USPC ...... 280/124.107; 280/124.149; 280/124.152; 280/124.137; 280/124.166; 267/189; 267/190; 267/191

(58) Field of Classification Search
USPC .................... 280/124.149, 124.152, 124.107, 280/124.106, 124.137, 124.166, 5.511, 280/FOR. 116, FOR. 146; 267/188, 189, 267/190, 191, 183
See application file for complete search history.

(56) References Cited

U.S. PATENT DOCUMENTS 2,085,738 A * 7/1937 Coleman ................ 280/124.107
2,509,803 A * 5/1950 Booth .......................... 280/788
(Continued)

FOREIGN PATENT DOCUMENTS

DE 102006055819 * 5/2008 ........... B60G 21/055
DE 102006055819 A1 5/2008
(Continued)

OTHER PUBLICATIONS

International Search Report; PCT/JP2011/003633; Sep. 6, 2011.

*Primary Examiner* — Keith Frisby
*Assistant Examiner* — Paul Dickson
(74) *Attorney, Agent, or Firm* — Studebaker & Brackett PC

(57) ABSTRACT

It is an object to effectively enhance rigidity of a subframe installed to couple a pair of right and left wheel suspension members, with a simple structure, and allow a stabilizer to be adequately installed. A subframe (3) installed to couple a pair of right and left wheel suspension members (2) together comprises a cross member (31) provided with a lateral-link support portion (14, 18) supporting an end of the lateral link (5, 6), a pair of right and left side members (33) each extending from a respective one of opposite vehicle-widthwise outer ends of the cross member (31), in a vehicle longitudinal direction; and a pair of right and left reinforcing members (35) each reinforcing a coupling section between the lateral-link support portion (14, 18) of the cross member (31) or a vicinity thereof, and a respective one of the side members (33). A stabilizer (10) is installed above the cross member (31) to extend in a vehicle widthwise direction in such a manner as to couple the right and left wheel suspension members 2, and each of the reinforcing members (35) is provided with a stabilizer support section torsionably supporting the stabilizer (10).

8 Claims, 10 Drawing Sheets

(56) References Cited

U.S. PATENT DOCUMENTS

| | | | | |
|---|---|---|---|---|
| 6,357,772 | B1 * | 3/2002 | Pelz et al. | 280/124.143 |
| 6,938,908 | B2 * | 9/2005 | Oda et al. | 280/124.109 |
| 8,025,313 | B2 | 9/2011 | Tanaka et al. | |
| 8,167,319 | B2 * | 5/2012 | Ogawa | 280/5.511 |
| 2007/0290473 | A1 * | 12/2007 | Buma | 280/124.106 |
| 2009/0008887 | A1 * | 1/2009 | Buma | 280/5.511 |
| 2009/0243272 | A1 | 10/2009 | Tanaka et al. | |

FOREIGN PATENT DOCUMENTS

| | | | |
|---|---|---|---|
| JP | 2000-142054 | A | 5/2000 |
| JP | 2002-046443 | A | 2/2002 |
| JP | 2003-104026 | A | 4/2003 |
| JP | 2007-182116 | A | 7/2007 |
| JP | 2009-255902 | A | 11/2009 |

* cited by examiner

VEHICLE SUSPENSION APPARATUS

TECHNICAL FIELD

The present invention relates to a vehicle suspension apparatus which comprises a wheel carrying member adapted to rotatably carry a wheel, a pair of right and left wheel suspension members each including a lateral link having one end mounted to the wheel carrying member, and a subframe installed to couple the right and left wheel suspension members together.

BACKGROUND ART

Heretofore, in a vehicle rear suspension structure for suspending a wheel by a trailing arm integrated with a wheel carrying member to extend in a longitudinal (frontward-rearward) direction of a vehicle (hereinafter referred to as "vehicle longitudinal direction"), and upper and lower lateral links extending in a widthwise (rightward-leftward) direction of the vehicle (hereinafter referred to as "vehicle widthwise direction") in approximately parallel relation to each other and at an acute angle with respect to the trailing arm in top plan view, a technique has been implemented in which a stabilizer is provided to couple a pair of right and left wheel suspension members together, wherein a fixation angle at which the stabilizer is fixedly mounted to each of the wheel suspension members, is set to allow the stabilizer to become approximately parallel to an instantaneous rotation axis of the wheel, which connects an apparent rotation center defined by the upper and lower lateral links in a stopped or static state of the wheel, and a pivot point of the trailing arm, so as to prevent the occurrence of torsion between the stabilizer and the wheel suspension member to ensure reliability of a mounting section therebetween, as disclosed in the following PTL 1.

CITATION LIST

Patent Literature

[PTL 1]
JP 2002-46443A

SUMMARY OF INVENTION

Technical Problem

In the vehicle rear suspension structure disclosed in the PTL 1, the stabilizer is disposed below a subframe installed to couple the right and left wheel suspension members together, and a stabilizer support section is installed rearward of the subframe to support a central portion of the stabilizer, and fixed to a vehicle body (so as to allow the stabilizer to be mounted to a vehicle body) through a clamping bracket installed rearward of the subframe to extend in an upward-rearward direction. However, there is a problem, for example, that it is difficult in terms of layout to adequately install the stabilizer clamping bracket without causing interference with the subframe, and a supported state of the stabilizer based on the clamping bracket is likely to become unstable.

In view of the above problem, the present invention is directed to providing a vehicle suspension apparatus capable of effectively improving rigidity of a subframe installed to couple right and left wheel suspension members together, with a simple configuration, and adequately installing a stabilizer so as to effectively bring out its function.

Solution to Problem

In order to solve the above problem, the present invention provides a vehicle suspension apparatus which comprises: a wheel carrying member (1) adapted to rotatably carry a wheel; a pair of right and left wheel suspension members (2; 7) each including a lateral link (5, 6) having one end mounted to the wheel carrying member (1); a subframe (3) installed to couple the right and left wheel suspension members together; and a stabilizer (10). The subframe (3) includes: a cross member (31) installed to extend in a vehicle widthwise direction and provided with a lateral-link support portion (14, 18) supporting the other end of the lateral link (5, 6); a pair of right and left side members (33) each extending from a respective one of opposite vehicle-widthwise outer ends of the cross member, in a vehicle longitudinal direction; and a pair of right and left reinforcing members (35) each reinforcing a coupling section between the lateral-link support portion (14, 18) of the cross member (31) or a vicinity thereof, and a respective one of the side members (33). The stabilizer (10) is installed at a position vertically higher than that of the cross member (31). The stabilizer (10) has a stabilizer body (49) provided to extend in the vehicle widthwise direction, and a pair of right and left extension portions (50) each extending from a respective one of opposite right and left ends of the stabilizer body (49), in the vehicle longitudinal direction. Each of the reinforcing members (35) is provided with a stabilizer support section (47) rollably supporting a corresponding one of the right and left ends of the stabilizer body (49), and each of the extension portions (50) has a distal end coupled to a corresponding one of the right and left wheel suspension members (2; 7) through a coupling link (25).

In the present invention, the vehicle suspension apparatus is provided with the reinforcing members each reinforcing the coupling section between the lateral-link support portion of the cross member or the vicinity thereof, and a respective one of the side members, so that it becomes possible to effectively reinforce the coupling section between the lateral-link support portion provided in the cross member or the vicinity thereof, and the side member, so as to effectively improve rigidity of the subframe. In addition, the stabilizer (10) is installed at a position higher than that of the cross member, and has the stabilizer body (49) extending in the vehicle widthwise direction and the right and left extension portions (50) each extending from a respective one of the right and left ends of the stabilizer body (49), in the vehicle longitudinal direction. Further, each of the reinforcing members (35) is provided with the stabilizer support section rollably supporting a corresponding one of the right and left ends of the stabilizer body (49), and each of the extension portions (50) has a distal end coupled to a corresponding one of the right and left wheel suspension members (2; 7) through the coupling link (25). This makes it possible to stably support the stabilizer body to the cross member, and reduce a vehicle-widthwise offset amount (distance) between the stabilizer support section and the extension portion at each of the right and left ends of the stabilizer body. Furthermore, a load input into one of the wheel suspension members during vehicle turning can be efficiently transmitted to the stabilizer body through the coupling link and the extension portion to allow the stabilizer body to be reliably twisted so as to effectively produce a reaction force for suppressing a roll displacement of a vehicle body. In other words, the present invention has an advantage of being able to install the stabilizer at an adequate position so as to effectively bring out its function, with a simple configuration.

DESCRIPTION OF EMBODIMENTS

Figure 1:
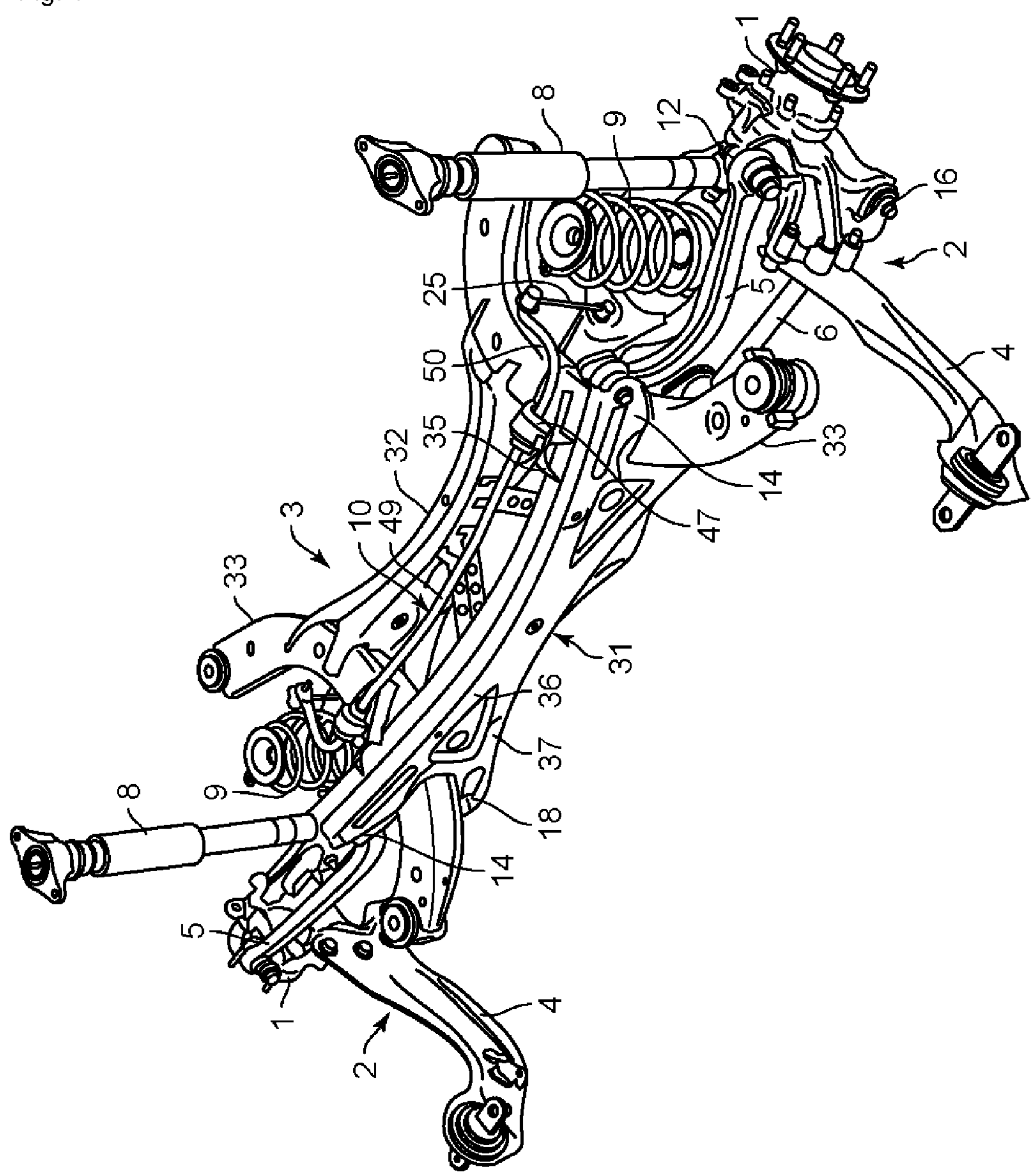
FIG. 1 is a perspective view illustrating a vehicle suspension apparatus according to one embodiment of the present invention.
Figure 2:
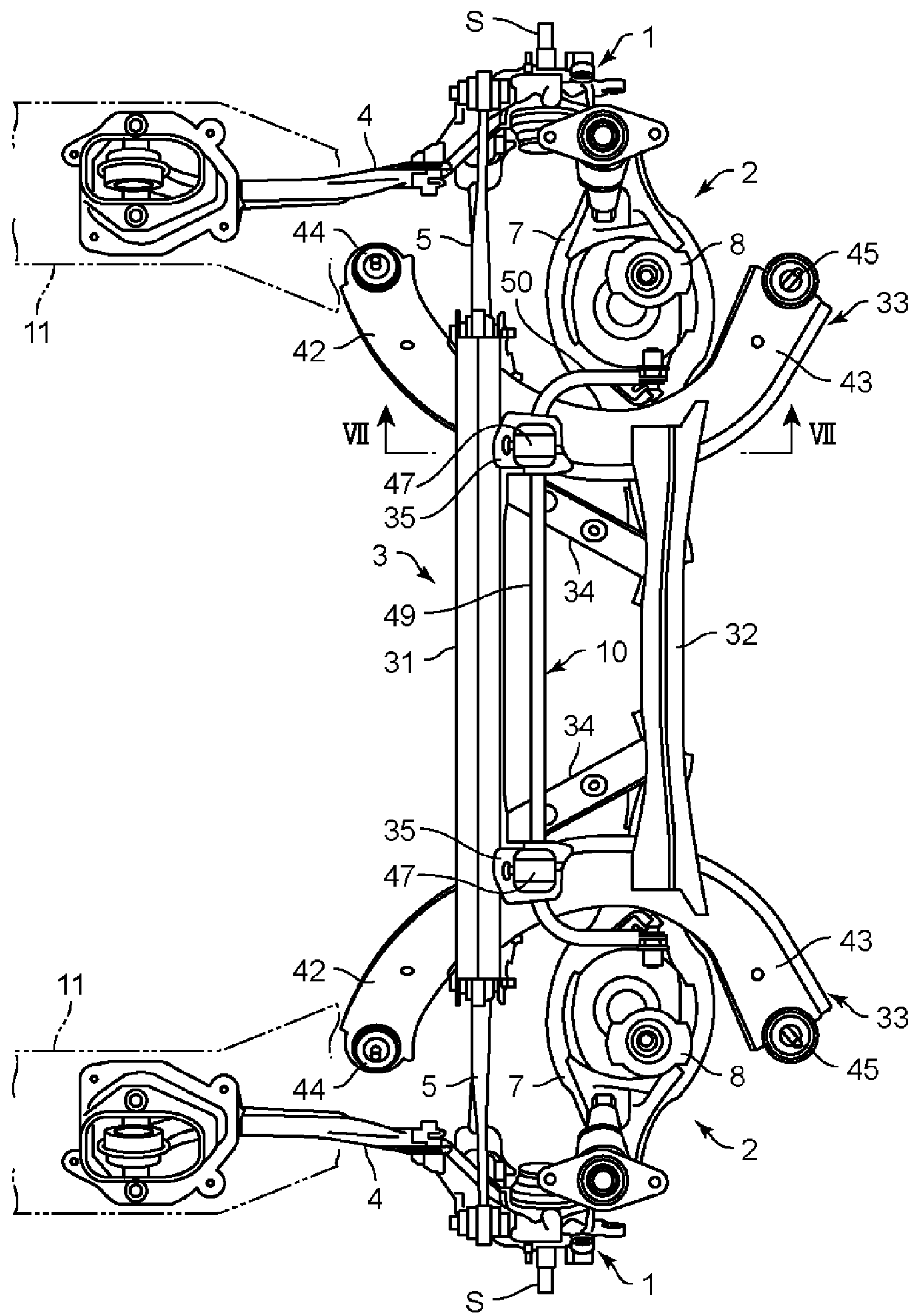
FIG. 2 is a top plan view of the suspension apparatus.
Figure 3:
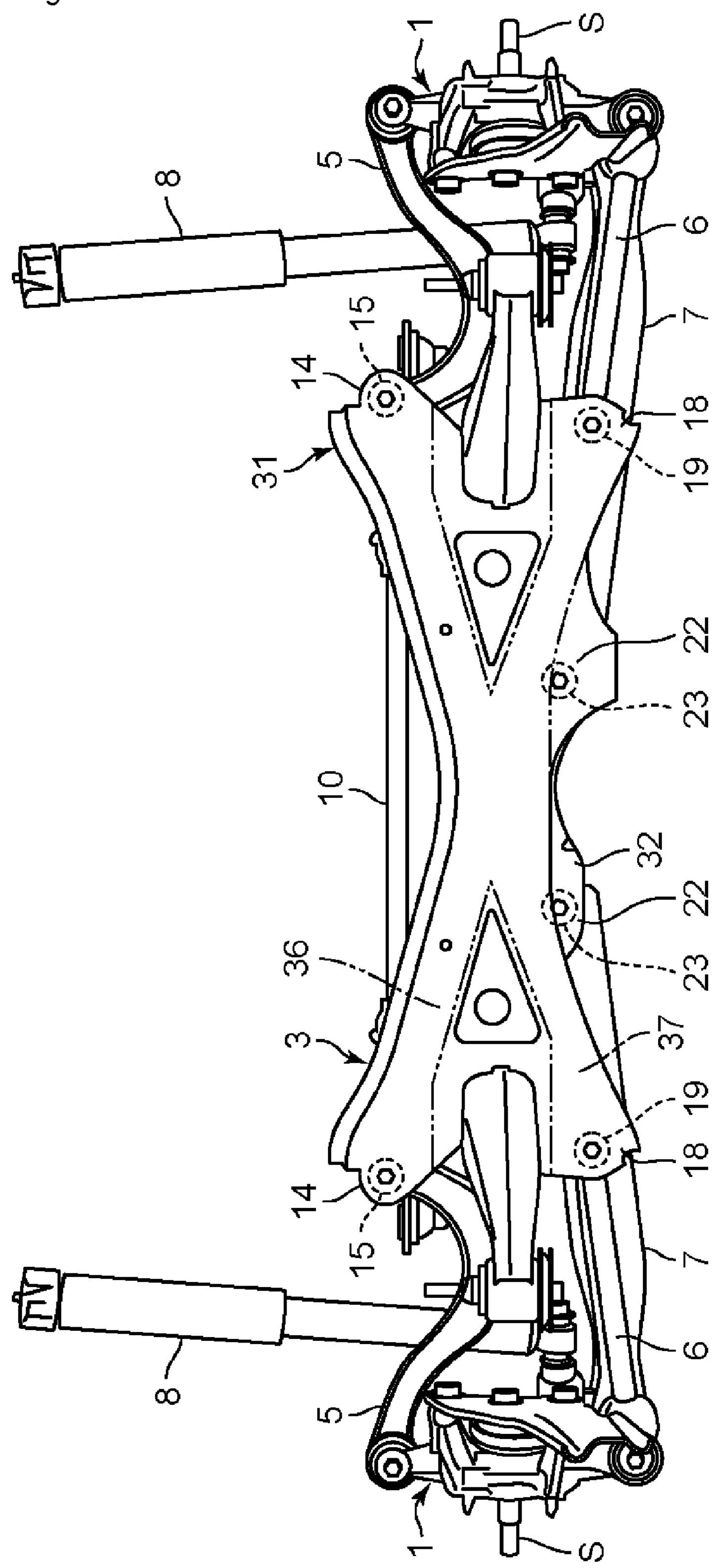
FIG. 3 is a front view of the suspension apparatus.

FIGS. 1 to 3 illustrate a vehicle suspension apparatus according to one embodiment of the present invention. The suspension apparatus comprises a wheel carrying member 1 made of a casting material or the like and adapted to rotatably carry a wheel consisting of a rear wheel of a vehicle, a pair of right and left wheel suspension members 2 each supporting the wheel carrying member 1, and a subframe 3 disposed in a rear of a vehicle body to couple the right and left wheel suspension members 2 together.

Each of the wheel suspension members 2 includes: a trailing arm 4 having one end mounted to the wheel carrying member 1; a pair of upper and lower lateral links 5, 6 each having one end swingably mounted to the wheel carrying member 1 and the other end swingably supported by the vehicle body, while being installed to extend in a vehicle widthwise direction; a lower link 7 disposed rearward of the upper and lower lateral links; a shock absorber 8 having a lower end supported by the wheel carrying member 1; a suspension spring 9 having a lower end supported by the lower link 7; and a stabilizer 10 installed to extend in the vehicle widthwise direction while passing above the subframe 3.

The trailing arm 4 is formed as a component prepared by subjecting a steel plate to press forming and installed to extend in a vehicle longitudinal direction. One end (rear end) of the trailing arm 4 is bolted to the wheel carrying member 1, and a front end (the other end) of the trailing arm 4 is supported by a rear side frame 11 constituting a frame of the vehicle body, through a rubber bush in an elastically displaceable manner.

Figure 4:
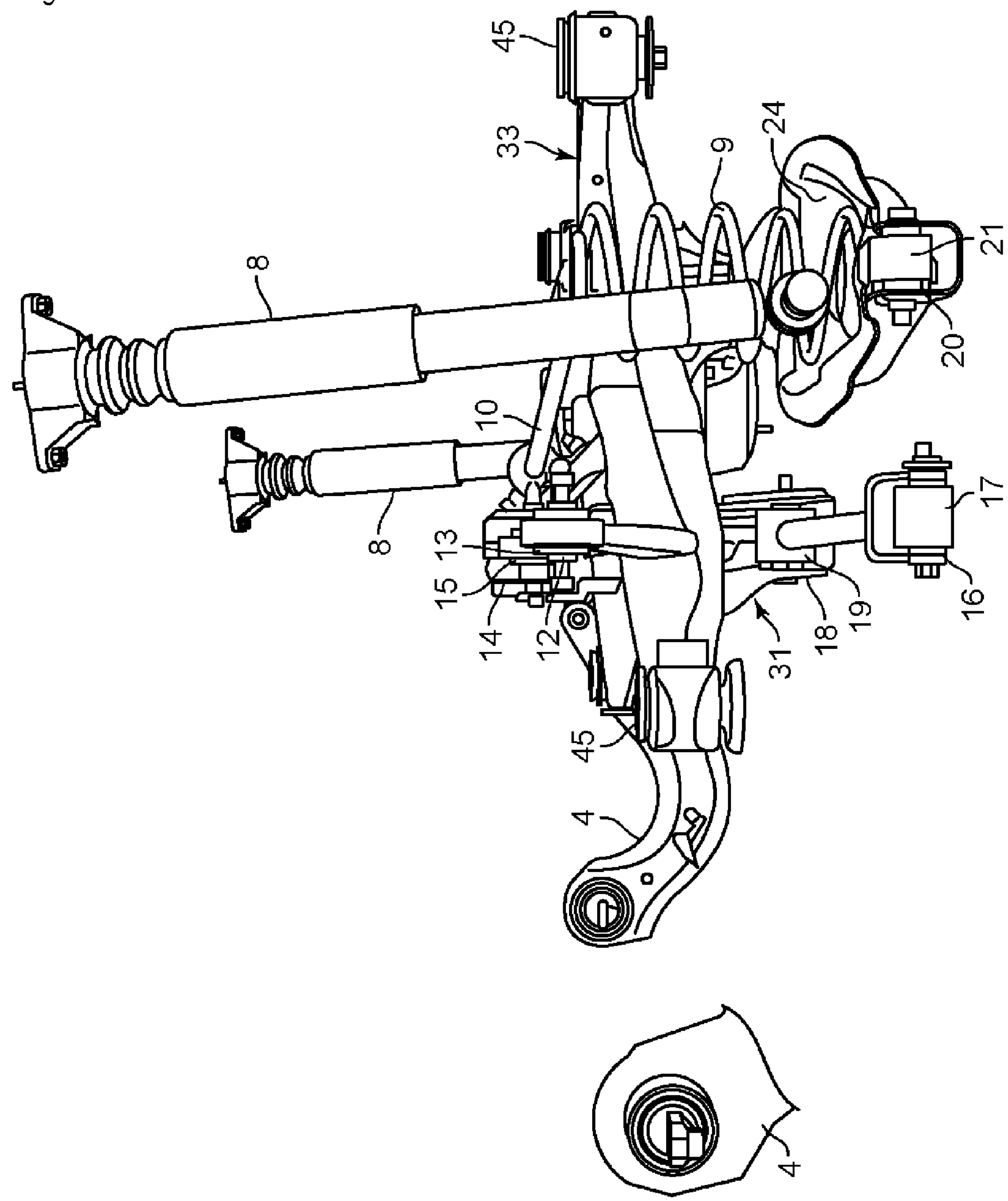
FIG. 4 is a side view of the suspension apparatus.
Figure 5:
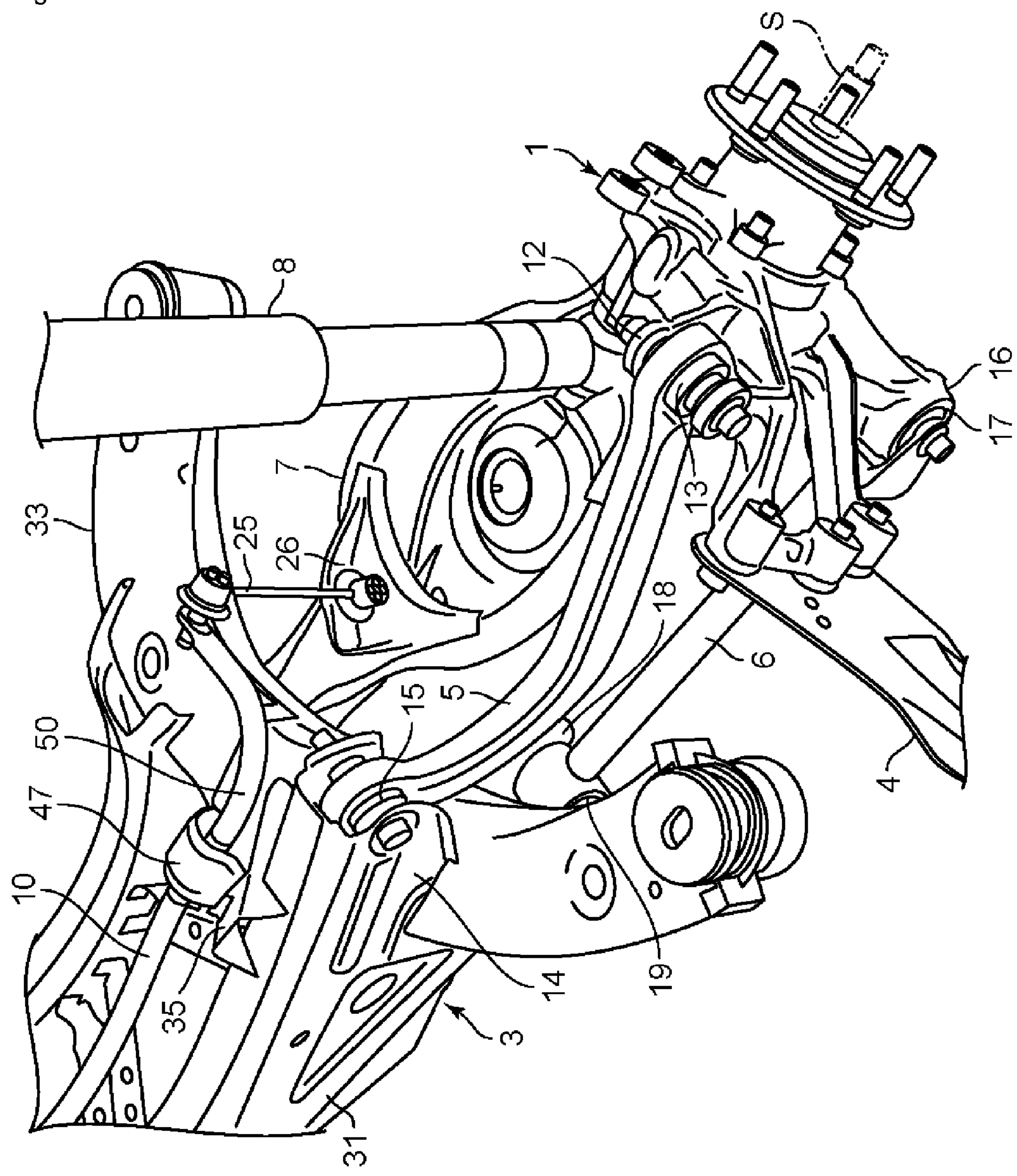
FIG. 5 is a perspective view illustrating a partial structure of the suspension apparatus.

As illustrated in FIGS. 3 to 5, etc., the lateral links 5, 6 are disposed above and below a rotary shaft S of the wheel, respectively, across the rotary shaft S. One end (vehicle-widthwise outer end) of the upper, first, lateral link 5 is mounted to a lateral-link mounting portion 12 provided in an upper portion of the wheel carrying member 1 at a position frontward of the rotary shaft S, through a rubber bush 13 in an elastically displaceable manner. The other end (vehicle-widthwise inner end) of the first lateral link 5 is supported by an upper lateral-link support portion 14 provided on an upper side of the subframe 3, through a rubber bush 15 in an elastically displaceable manner.

One end (vehicle-widthwise outer end) of the second lateral link 6 disposed below the rotary shaft S of the wheel is mounted to a lateral-link mounting portion 16 provided in a lower portion of the wheel carrying member 1 at a position frontward of the rotary shaft S, through a rubber bush 17 in an elastically displaceable manner. The other end (vehicle-widthwise inner end) of the second lateral link 6 is swingably supported by a lower lateral-link support portion 18 provided on a lower side of the subframe 3, through a rubber bush 19.

In side view, the lateral-link mounting portions 12, 16 are disposed above and below the rotary shaft S in spaced-apart relation to each other by a given distance, and disposed frontward of the rotary shaft S of the wheel and at approximately the same positions in the vehicle longitudinal direction. Similarly, in side view, the upper and lower lateral-link support portions 14, 18 provided in the subframe 3 are disposed above and below the rotary shaft S in spaced-apart relation to each other by a given distance, and disposed frontward of the rotary shaft S of the wheel and at approximately the same positions in the vehicle longitudinal direction.

One end (vehicle-widthwise outer end) of the lower link 7 is mounted to a lower-link mounting portion 20 provided in a lower portion of the wheel carrying member 1 at a position rearward of the rotary shaft S of the wheel, through a rubber bush 21 in an elastically displaceable manner. The other end (vehicle-widthwise inner end) of the lower link 7 is supported by a lower-link support portion 22 provided in a rear portion of the subframe 3, through a rubber bush 23 in an elastically displaceable manner.

Each of the rubber bushes 21, 23 provided in the mounting portion 20 and the support portion 22 for the lower link 7 has a hardness set to a highest value, i.e., a first hardness, and each of the rubber bushes 17, 19 provided in the mounting portion 16 and the support portion 18 for the second lateral link 6 has a hardness set to a lowest value, i.e., a second hardness. Further, each of the rubber bushes 13, 15 provided in the mounting portion 12 and the support portion 14 for the first lateral link 5 has a hardness set to an intermediate value between the first hardness and the second hardness.

The lower link 7 has a concave portion 24 formed to support the lower end of the suspension spring 9. The suspension spring 9 is disposed to extend between the concave portion 24 and the rear side frame 11 located above the concave portion 24. The lower link 7 also has a lock portion 26 which locks a lower end of a coupling link 25 provided at each of opposite lateral (vehicle-widthwise outer) ends of the stabilizer 10 to extend in an upward-downward direction (see FIG. 5). The lock portion 26 for the stabilizer 10 is disposed at a vehicle-widthwise inner position with respect to the upper and lower lateral-link support portions 14, 18 provided in the subframe 3, to rollably support a ball joint provided at the lower end of the coupling link 25.

The shock absorber 8 is installed at a position rearward of the rotary shaft S of the wheel to extend in an upward-downward direction in a posture inclined frontwardly by a given angle. The lower end of the shock absorber 8 is rigidly joined to the wheel carrying member 1 by bolting, and an upper end of the shock absorber 8 is supported by a strut tower (not illustrated) constituting the frame of the vehicle body, through a rubber insulator or the like.

As illustrated in FIGS. 1 and 2, etc, the subframe 3 includes: a front cross member 31 installed to extend in the vehicle widthwise direction at a position frontward of the rotary shaft S of the wheel; a rear cross member 32 installed to extend in the vehicle widthwise direction at a position rearward of the rotary shaft S; a pair of right and left side members 33 each extending from a respective one of opposite vehicle-widthwise outer ends of each of the front and rear cross members, in the vehicle longitudinal direction; a pair of right and left connection members 34 each connecting the front cross member 31 and the rear cross member 32 at a vehicle-widthwise inner position with respect to a corresponding one of the side members 33; and a pair of right and left reinforcing members 35 each reinforcing a coupling section between the front cross member 31 and a respective one of the side members 33.

Figure 6:
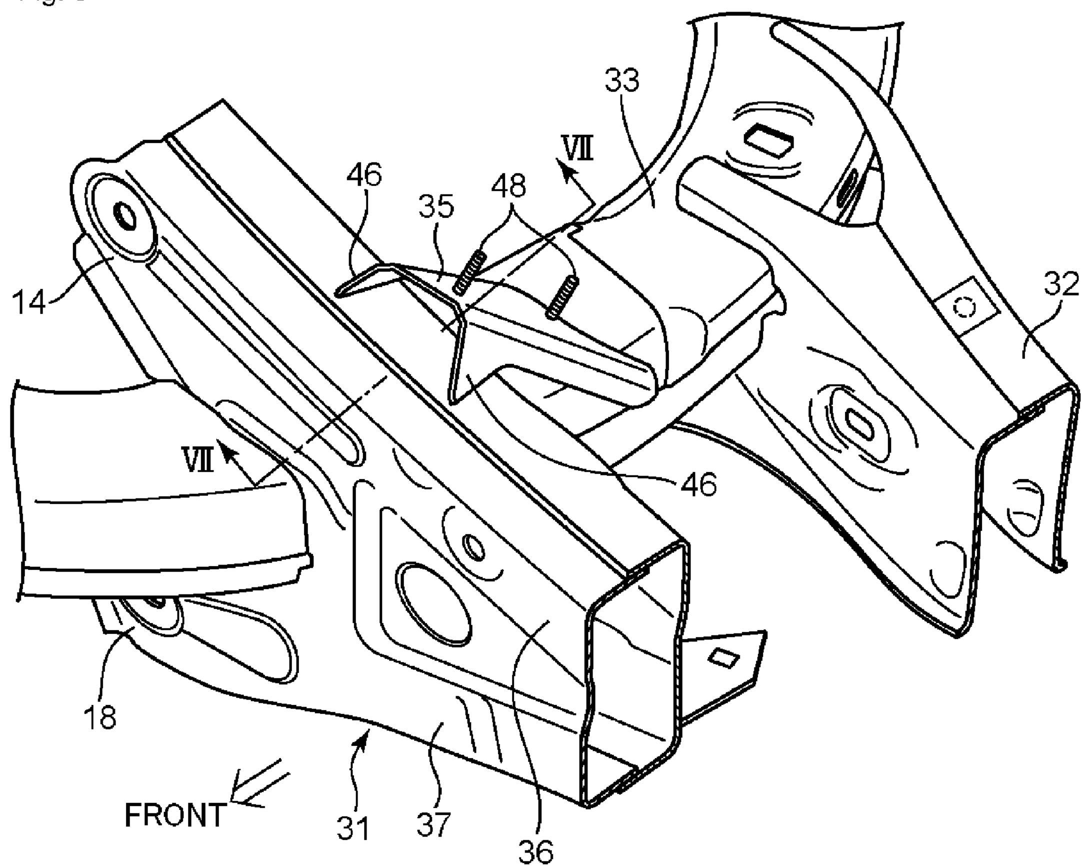
FIG. 6 is perspective view illustrating a specific structure of a reinforcing member.

As illustrated in FIG. 3, in front view, the front cross member 31 includes a first front cross member 36 extending obliquely to couple the upper lateral-link support portion 14 provided on a left upper side of the front cross member 31 and the lower lateral-link support portion 18 provided on a right lower side of the front cross member 31, and a second front cross member 37 extending obliquely to couple the upper lateral-link support portion 14 provided on a right upper side of the front cross member 31 and the lower lateral-link support portion 18 provided a left lower side of the front cross member 31. Thus, the first and second front cross members 36, 37 intersect to form an X shape in front view. Respective lateral ends of the first and second front cross members 36, 37 are installed in spaced-apart relation to each other by a given distance in an upward-downward direction, in side view, so that a frame member extending in the upward-downward direction is formed at each of opposite lateral ends of the front cross member 31, as illustrated in FIG. 6.

The rear cross member 32 is installed to extend in the vehicle widthwise direction in such a manner as to couple the right and left side members 33. Further, the pair of right and left lower-link support portions 22 are provided in the rear cross member 32, and the vehicle-widthwise inner end of the lower link 7 is swingably supported by each of the right and left lower-link support portions 22 through the rubber bush 23 (see FIG. 3).

Each of the side members 33 of the subframe 3 is installed to extend in the vehicle longitudinal direction while passing between the upper and lower lateral-link support portions 14, 18 provided at a corresponding one of the lateral ends of the front cross member 31. The side member 33 is connected to respective lateral ends of the front cross member 31 and the rear cross member 32, so that the front cross member 31 and the rear cross member 32 are coupled together by the side member 33.

The side member 33 has a front portion 42 provided to protrude frontwardly and outwardly from the lateral end of the front cross member 31, and a rear portion 43 provided to protrude rearwardly and outwardly from the lateral end of the rear cross member 32. Thus, in front view, the side member 33 is formed in a semi-circular shape having a longitudinally central portion curved concavedly and inwardly in the vehicle widthwise direction. Further, a front mount portion 44 and a rear mount portion 45 are provided, respectively, at distal ends of the front portion 42 and the rear portion 43, and the side member 33 is connected to the lateral ends of the front and rear cross members 31, 32 at a position where the side member 33 is concavedly curved inwardly with respect to the front and rear mount portions 44, 45 in the vehicle widthwise direction.

Figure 7:
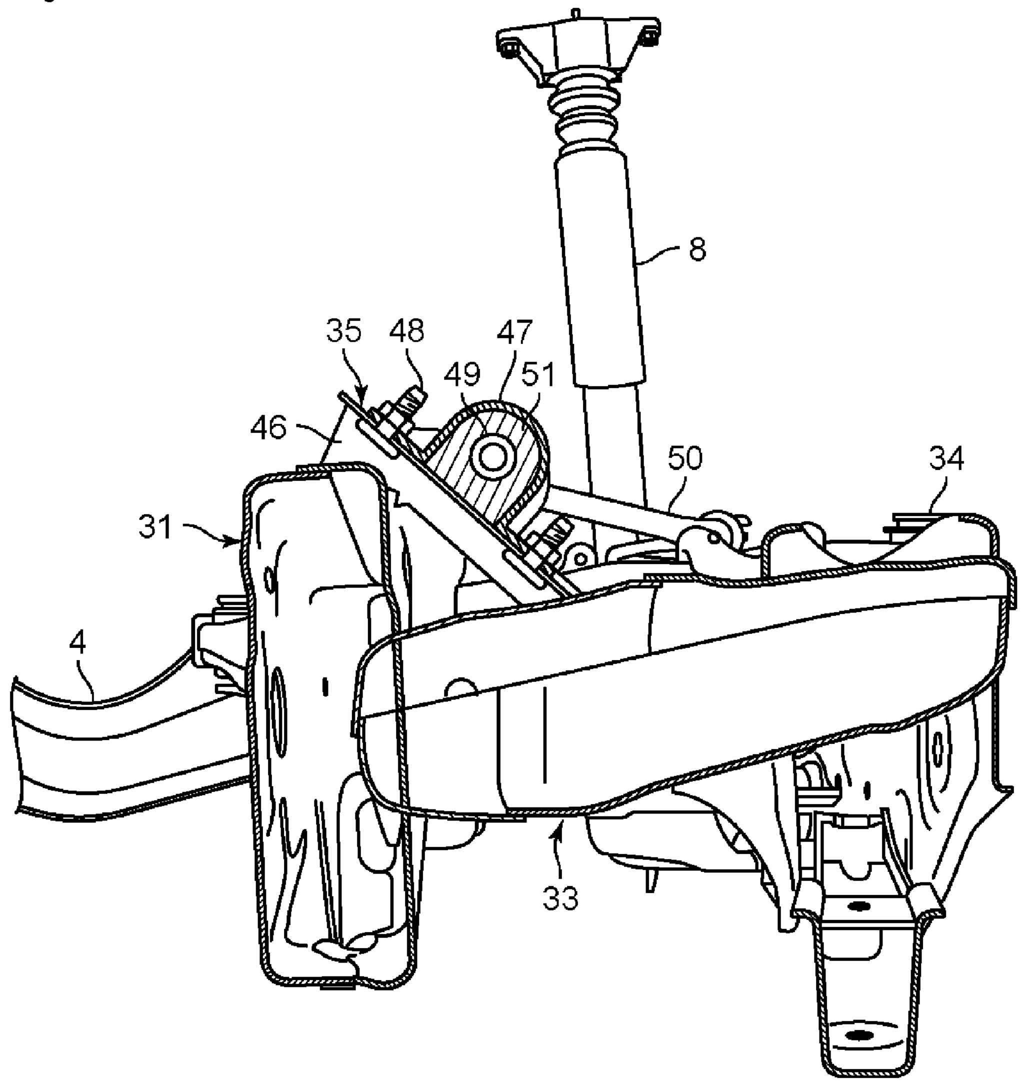
FIG. 7 is a sectional view taken along the line VII-VII in FIG. 2.

As illustrated in FIGS. 6 and 7, the upper lateral-link support portion 14 or a vicinity thereof, and the side member 33, are coupled together through the reinforcing member 35 provided on a top portion of the front cross member 31, so that a coupling section between the front cross member 31 and the side member 33 is reinforced. More specifically, a triangular pawl-shaped protrusion 46 provided in a front portion of the reinforcing member 35 is joined to a top surface and a rear surface of the front cross member 31, and a rear portion of the reinforcing member 35 is joined to a top surface and a vehicle-widthwise inner side surface of the side member 33. In this manner, a coupling section between a vicinity of the upper lateral-link support portion 14 provided on an upper side of the lateral end of the front cross member 31, and a top surface portion of the side member 33, is reinforced. Specifically, each of the reinforcing members 35 has a front portion formed as the protrusion 46 and joined to the top and rear surfaces of the front cross member 31, a rear portion joined to the top and vehicle-widthwise inner side surfaces of the side member 33, and a top surface portion disposed in a posture inclined frontwardly and upwardly. Thus, based on the reinforcing member 35 disposed in the inclined posture, an effect of preventing tilting of the front cross member 31 in the vehicle longitudinal direction can be improved to enhance an effect of reinforcing the coupling section between the front cross member 31 and the side member 33.

Further, a mounting bolt 48 is provided to protrude from a top surface of the reinforcing member 35 so as to allow a support bracket 47 of the stabilizer 10 to be mounted to the top surface. In top plan view, the stabilizer 10 has a stabilizer body 49 installed to extend in the vehicle widthwise direction, and a pair of right and left extension portions 50 each provided to extend from a respective one of opposite right and left ends of the stabilizer body 49, in the vehicle longitudinal direction. Each of the right and left ends of the stabilizer body 49 is rollably supported by a support member 51 which is fixed to the top surface of the reinforcing member 35 through the support bracket 47. As above, a stabilizer support section comprising the support bracket 47 is provided on the top surface portion of the reinforcing member 35 disposed in the inclined posture. Thus, a dimension of an upwardly protruding portion of the stabilizer support section is reduced, so that the stabilizer 10 can be compactly disposed rearward of the front cross member 31.

The extension portion 50 of the stabilizer 10 and the lock portion 26 of the lower link 7 are coupled together through the coupling link 25. Thus, each of opposite vehicle-widthwise ends of the stabilizer 10 can be locked to the wheel suspension member 2 at a vehicle-widthwise inner position with respect to the upper and lower lateral-link support portions 14, 18 of the front cross member 31. Then, an external force, such as a push-up force, input into one of the right and left lower links 7 during vehicle running is transmitted to the other lower link 7 via the stabilizer 10 and the right and left coupling links 25, to suppress inclination of the vehicle body during vehicle turning.

As above, the vehicle suspension apparatus according to the above embodiment comprises a wheel carrying member 1 adapted to rotatably carry a wheel, a pair of right and left wheel suspension members 2 each including a lateral link 5, 6 having one end mounted to the wheel carrying member 1, a subframe 3 installed to couple the right and left wheel suspension members 2 together, and a stabilizer 10. The subframe 3 includes: a front cross member 31 installed to extend in a vehicle widthwise direction and provided with a lateral-link support portion 14, 18 supporting the other end of the lateral link 5, 6; a pair of right and left side members 33 each extending from a respective one of opposite vehicle-widthwise outer ends of the front cross member 31, in a vehicle longitudinal direction; and a pair of right and left reinforcing members 35 each reinforcing a coupling section between the lateral-link support portion 14, 18 of the front cross member 31 or a vicinity thereof, and a respective one of the side members 33. The stabilizer 10 is installed at a position higher than that of the front cross member 31 to generally extend in the vehicle widthwise direction, and each of the reinforcing members 35 is provided with a stabilizer support section (the aforementioned support bracket 47, etc.) rollably supporting a corresponding one of opposite right and left ends of a stabilizer body 49 of the stabilizer 10 installed to extend in the vehicle widthwise direction. Thus, it becomes possible to effectively reinforce the coupling section between the vicinity of the lateral-link support portion 14, 18 provided in the front cross member 31, and a respective one of the side members 33, so as to sufficiently enhance rigidity of the subframe 3. In the above embodiment, the stabilizer 10 is installed to extend in the vehicle widthwise direction at a position above the front cross member 31, and each of the reinforcing members 35 is provided with the stabilizer support section rollably supporting the corresponding end of the stabilizer body 49 installed to extend in the vehicle widthwise direction. Further, a distal end of each of a pair of right and left extension portions 50 provided to extend from respective ones of the right and left ends of the stabilizer body 49 is coupled to a corresponding one of the wheel suspension members 2 (the aforementioned right and left lower links 7). Thus, it becomes possible to stably support the stabilizer body 49 to the front cross member 31, and reduce a vehicle-widthwise offset amount (distance) between the stabilizer support section and the extension portion 50 at each of the right and left ends of the stabilizer body 49. In addition, it becomes possible to efficiently transmit a load input into one of the wheel suspension members 2 during vehicle turning, to the stabilizer body 49 through the coupling link 25 and the extension portion 50 to allow the stabilizer body 49 to be reliably twisted so as to effectively produce a reaction force for suppressing a roll displacement of a vehicle body. In other words, the above embodiment has an advantage of being able to install the stabilizer at an adequate position so as to effectively bring out its function, with a simple configuration.

More specifically, in the above embodiment, the support bracket 47 is mounted to a top surface of each of the reinforcing member 35 installed to reinforce the coupling section between the vicinity of the lateral-link support portion 14, 18 and a respective one of the side members 33, by means of a mounting bolt 48 provided to protrude from the top surface, and each of the right and left ends of the stabilizer body 51 is rollably supported based on a support member 51 held by the support bracket 47, so that it becomes possible to allow the each of the reinforcing members 35 to have both a function as a reinforcing bracket for reinforcing the coupling section between the front cross member 31 and the side member 31, and a function as the stabilizer support section. This provides an advantage of being able to effectively reinforce the coupling section between the vicinity of the lateral-link support portion 14, 18 provided in the front cross member 31, and the side member 33, so as to effectively improve rigidity of the subframe 3, with a simple configuration, and adequately install the stabilizer 10 so as to effectively bring out its function.

In the above embodiment, each of opposite widthwise ends of the stabilizer 10 is locked to a respective one of the wheel suspension members 2, specifically, the lower links 7, at a vehicle-widthwise inner position with respect to the lateral-link support portion 14, 18 of the front cross member 31, so that it becomes possible to prevent the occurrence of a situation where a portion of the stabilizer 10 rotatably supported by the support bracket 47 and the support member 51, and a lock portion 26 provided in the wheel suspension member 2 to lock the stabilizer 10, are largely offset in the vehicle widthwise direction, which provides an advantage of being able to sufficiently bring out the function of the stabilizer 10 so as to effectively suppress the roll displacement of the vehicle body.

As disclosed in the above embodiment, each of the reinforcing members 35 has a front portion formed as a protrusion 46 and joined to a top surface and a rear surface of the front cross member 31, a rear portion joined to a top surface and a vehicle-widthwise inner side surface of a corresponding one of the side members 33, and a top surface portion disposed in a posture inclined frontwardly and upwardly. Thus, based on the reinforcing member 35 disposed in the inclined posture, an effect of preventing tilting of the front cross member 31 in the vehicle longitudinal direction can be improved to enhance an effect of reinforcing the coupling section between the front cross member 31 and the side member 33. Further, a stabilizer support section comprising the support bracket 47 is provided on the top surface portion of the reinforcing member 35 disposed in the inclined posture. Thus, a dimension of an upwardly protruding portion of the stabilizer support section is reduced, so that the stabilizer 10 can be compactly disposed rearward of the front cross member 31.

In the above embodiment, each of the wheel suspension members includes, as the lateral link, a pair of upper and lower lateral links 5, 6 each having one, first, end swingably mounted to the wheel carrying member 1 and the other, second, end swingably supported by the vehicle body, while being installed to extend in the vehicle widthwise direction, and further comprises a lower link 7 having one end mounted to a lower portion of the wheel carrying member at a position rearward of the rotary shaft S of the wheel and the other end swingably supported by the vehicle body. The first ends of the upper and lower lateral links 5, 6 are mounted to an upper portion and a lower portion of the wheel carrying member 1 at positions frontward of the rotary shaft S of the wheel, and respective mounting portions 12, 16 for mounting the upper and lower lateral links 5, 6 are disposed at approximately the same positions in the vehicle longitudinal direction in side view. This provides an advantage of being able to obtain excellent suspension performance, and effectively enhance steering stability during vehicle turning, with a simple configuration.

Specifically, in the above embodiment, a pair of upper and lower lateral-link support portions 14, 18 are provided, respectively, at opposite right and left ends of the front cross member 31 constituting the subframe 3 installed to couple the right and left wheel suspension members 2, and one end of the lower link 7 disposed rearward of the upper and lower lateral-link support portions 14, 18 is swingably supported by the vehicle body at a position rearward of the rotary shaft S of the wheel, so that vehicle steering stability can be effectively enhanced by biasing a turning outer wheel (rear wheel located on an outer side during vehicle turning), toward a direction causing toe-in (toe-in direction). The term "toe-in" means that a front end (called "toe") of a tire is moved into an inward side of a vehicle body on the basis of a vehicle body oriented in a traveling direction. Conversely, a state when the toe is moved outwardly is referred to as "toe-out".

Figure 8:
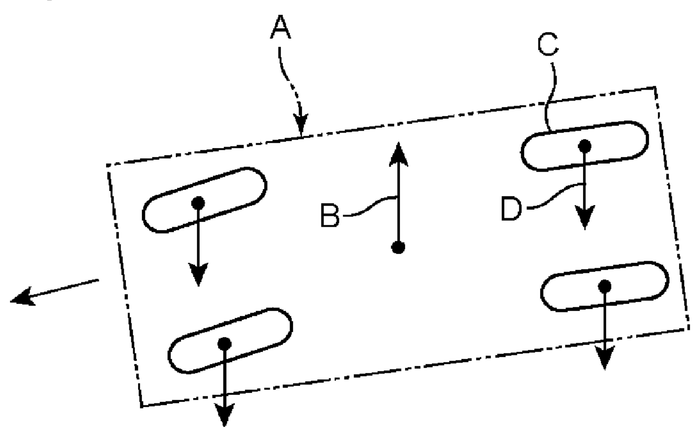
FIG. 8 is an explanatory diagram illustrating a state of action of cornering force.
Figure 9:
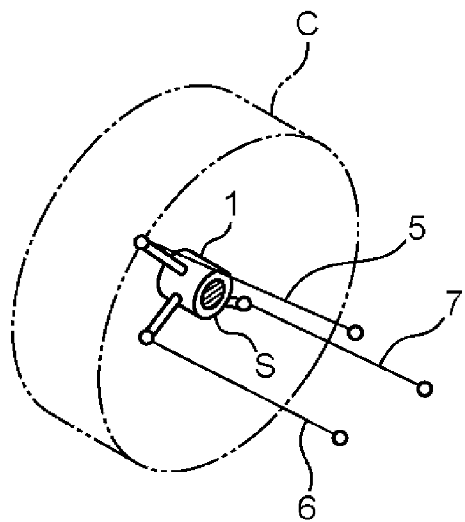
FIG. 9 is a perspective view illustrating a schematic configuration of a turning outer wheel.
Figure 10:
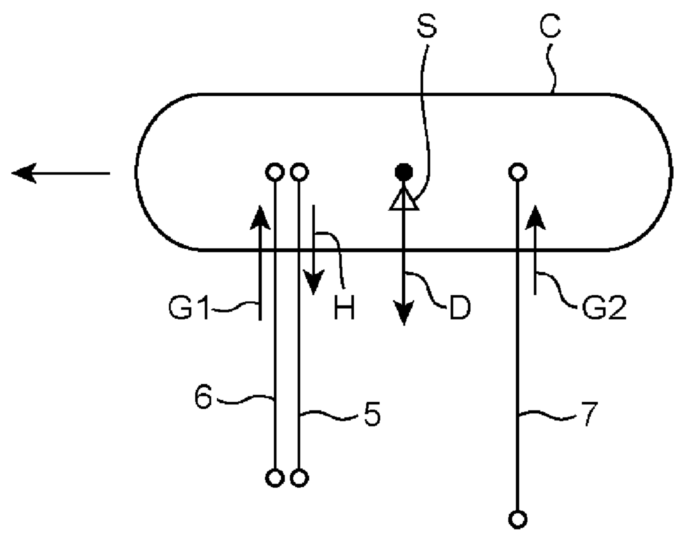
FIG. 10 is a top plan view illustrating a state when stress acts on a turning outer wheel, in the embodiment of the present invention.

For example, as illustrated in FIG. 8, in a situation where a vehicle is turning counter-clockwise, an centrifugal force B causing a vehicle body A to be moved rightwardly, and a cornering force D biasing a tire ground point of each wheel inwardly against the centrifugal force B, act on the vehicle. Thus, as illustrated in FIGS. 9 and 10, according to the cornering force D acting on an turning outer wheel C which is a rear wheel located on an outer side with respect to a turning direction, a compression stress G1 and a compression stress G2 are produced, respectively, in a second lateral link 6 and a lower link 7 each located below a rotary shaft S of the turning outer wheel C serving as a support point, and a tensile stress H is produced in a first lateral link 5 located above the rotary shaft S.

In the top plan view illustrated in FIG. 10, in the second lateral link 6 disposed below the first lateral link 5 and rearward of the rotary shaft S, the compression stress G1 is produced correspondingly to both the cornering force D and the tensile stress H produced in the first lateral link 5. Differently, in the lower link 7 disposed rearward of the rotary shaft S, the compression stress G2 is produced correspondingly to only the cornering force D, i.e., a stress having a value less than the compression stress G1 acting on the second lateral link 6 is produced.

As above, based on balance in rotation moment about an installation location of the rotary shaft S, the compression stress greater than that in the lower link 7 located rearward of the rotary shaft S is produced in the second lateral link 6 located frontward of the rotary shaft S. Thus, rubber bushes 17, 19 provided in the second lateral link 6 is compressively deformed more largely than rubber bushes 21, 23 provided in the lower link 7, and thereby the turning outer wheel C is deformed in a toe-in direction.

Figure 11:
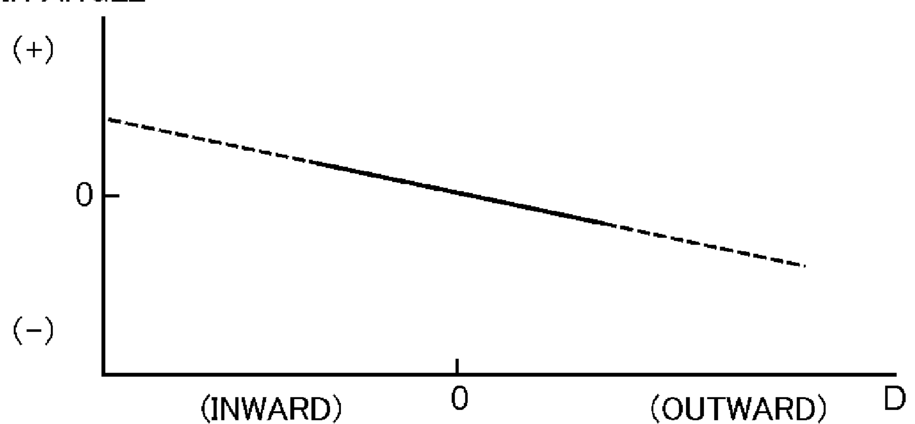
FIG. 11 is a graph illustrating a toe-in characteristic of the turning outer wheel in the embodiment of the present invention.

Based on stress calculation, it was tested how a toe-in angle of the turning outer wheel C is changed along with an increase in inward cornering force D acting on the turning outer wheel C. As a result, it was ascertained that the toe-in angle of the turning outer wheel C is changed to a plus direction along with an increase in the inward cornering force D, as shown in FIG. 11.

Figure 12:
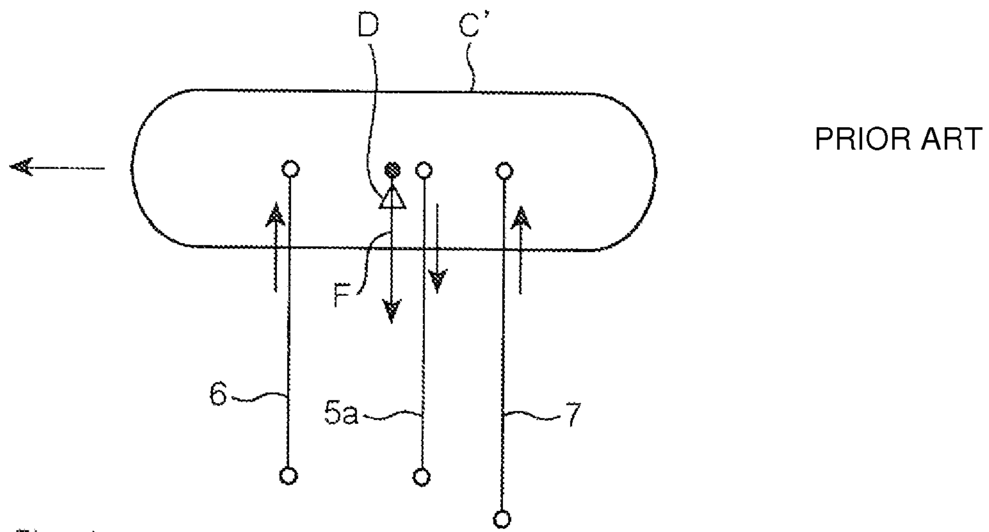
FIG. 12 is a top plan view illustrating a state when stress acts on a turning outer wheel in a comparative example.

On the other hand, using a comparative example where a first lateral link 5*a* is disposed at a position between the second lateral link 6 and the lower link 7 and closer to the lower link 7, i.e., disposed slightly rearward of the rotary shaft S, as illustrated in FIG. 12, it was tested how the toe-in angle of the turning outer wheel C is changed along with an increase in inward cornering force D acting on the turning outer wheel C, based on stress calculation. As a result, it was ascertained that the toe-in angle of the turning outer wheel C is changed to a minus direction (toe-out direction) along with an increase in the inward cornering force D, as shown in FIG. 13, and thereby steering stability is deteriorated.

Figure 14:
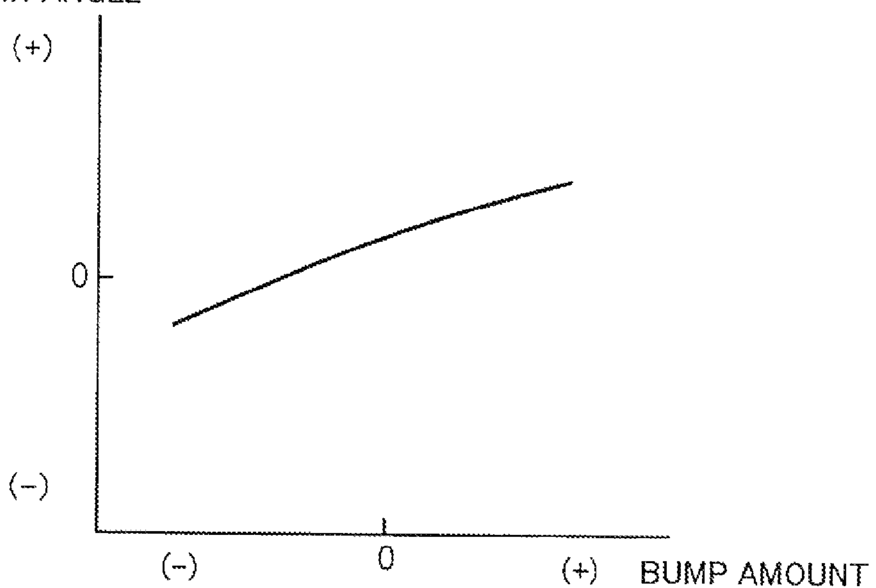
FIG. 14 is a graph illustrating a correspondence relationship between a wheel bump amount and a toe-in angle of a wheel.
Figure 15:
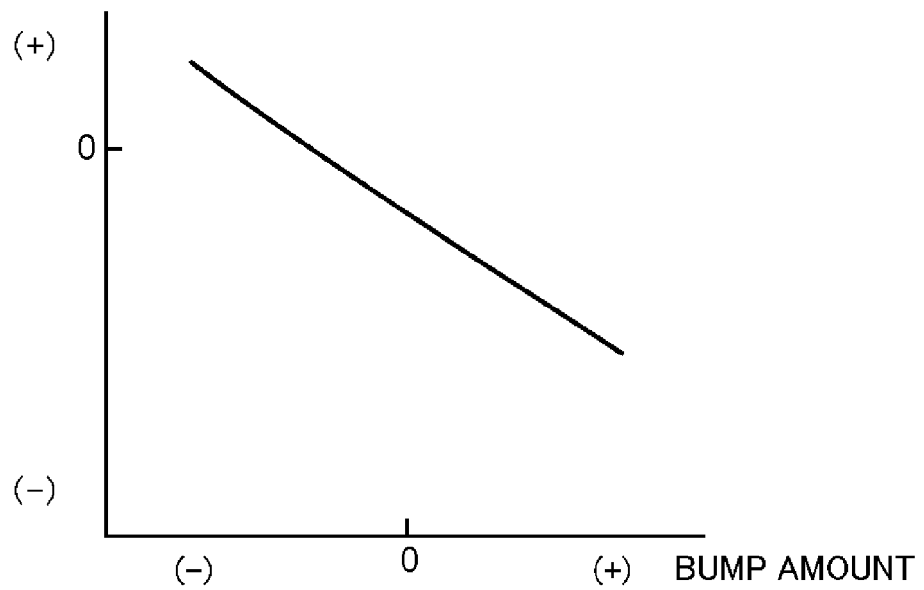
FIG. 15 is a graph illustrating a correspondence relationship between a wheel bump amount and a camber angle of a wheel.
Figure 16:
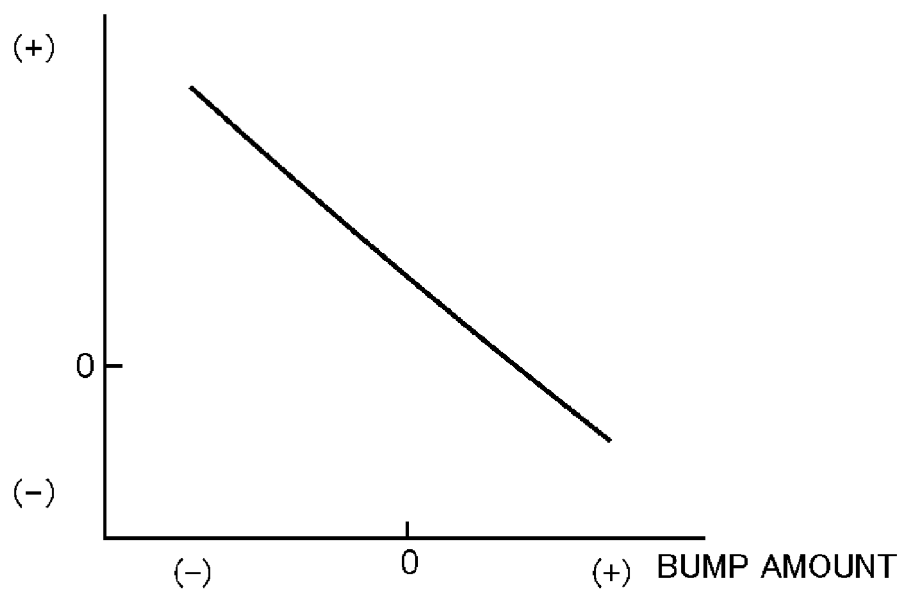
FIG. 16 is a graph illustrating a correspondence relationship between a wheel bump amount and a roll-center height.

Further, in the above embodiment, the first ends of the first and second lateral links 5, 6 are mounted to respective one of the upper and lower portions of the wheel carrying member 1 at a position frontward of the rotary shaft S of the wheel, and the respective mounting portions 12, 16 for mounting the upper and lower lateral links 5, 6 are disposed at approximately the same positions in the vehicle longitudinal direction in side view, as described above. This also provides an advantage of being able to perform an operation such as design change or tuning for optimizing a change in geometry of the suspension apparatus during wheel bump, in an easy and adequate manner. Specifically, in order to effectively improve vehicle ride quality, it is desirable to set a correspondence relationship between a wheel bump amount and a toe-in angle, a correspondence relationship between the wheel bump amount and a camber angle, and a correspondence relationship between the wheel bump amount and a roll-center height, in respective manners as illustrated in FIG. 14, FIG. 15 and FIG. 16. The term "camber angle" means an angle at which an upper portion of a tire is inclined outwardly or inwardly (inverted V shape), when viewed from a front of a vehicle. An outwardly-inclined angle is called, "positive camber", and an inwardly-inclined angle is called, "negative camber". The term "roll center" means a center of rolling (: rolling about a segment line extending in a vehicle traveling direction) of a vehicle body, when viewed from a front (or rear) of a vehicle, and the term "roll-center height" means a height of the roll center.

Figure 13:
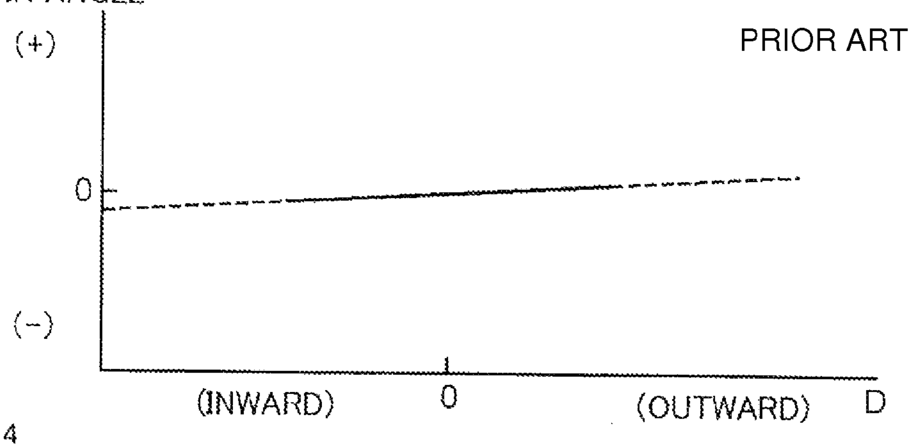
FIG. 13 is a graph illustrating a toe-in characteristic of the turning outer wheel in the comparative example.

In a conventional apparatus where the first lateral link 5*a* is disposed between the second lateral link 6 and the lower link 7, when one of respective instruction positions, lengths or the like of the first lateral link 5*a*, the second lateral link 6 and the lower link 7 is changed to set the correspondence relationship between the wheel bump amount and the toe-in angle to an adequate value as illustrated in FIG. 13, the correspondence relationship between the wheel bump amount and the camber angle and the correspondence relationship between the wheel bump amount and the roll-center height will be inevitably changed. Thus, if these relationships become inadequate, it is necessary to restart the design from the beginning. Moreover, it is extremely difficult to set all of the relationships to adequate values.

In contract, in the above embodiment where the first ends of the first and second lateral links 5, 6 are mounted to respective one of the upper and lower portions of the wheel carrying member 1 at a position frontward of the rotary shaft of the wheel, and the respective mounting portions 12, 16 for mounting the upper and lower lateral links 5, 6 are disposed at approximately the same positions in the vehicle longitudinal direction in side view, wherein the lower link 7 is disposed rearward of the rotary shaft, even if one of respective instruction positions, lengths or the like of the first to third lateral links 5 to 7 is changed to set one of a plurality of characteristics to an adequate value, the remaining characteristics will not be largely changed, which provides an advantage of being able to facilitate the above operation such as design change.

As disclosed in the above embodiment, a frame member comprised of the front cross member 31 of the subframe 3 comprises a first front cross member 36 and a second front cross member 37 arranged to intersect to form an X shape in front view, and the pair of upper and lower lateral link support portions 14, 18 are disposed at each of opposite right and left end regions of the first and second front cross members 36, 37. This provides an advantage of being able to effectively enhance the rigidity in the vehicle widthwise direction In the above configuration, for example, during clockwise vehicle turning, a load is applied to the left lower lateral-link support portion 18 in a direction causing the front cross member 31 to be compressed, and simultaneously a load is applied to the right upper lateral-link support portion 14 located in diagonal relation to the left lower lateral-link support portion 18, in a direction causing the front cross member 31 to be compressed, so that the two loads will be canceled out. Further, a load is applied to the left upper lateral-link support portion 14 in a direction causing the front cross member 31 to be tensioned, and simultaneously a load is applied to the right lower lateral-link support portion 18 located in diagonal relation to the left upper lateral-link support portion 14, in a direction causing the front cross member 31 to be tensioned, so that the two loads will be canceled out. This provides an advantage of being able to effectively support an input load from the right and left wheel suspension members 2, while simplifying a structure of the front cross member 31.

As disclosed in the above embodiment, the pair of right and left side members 33 each extending from a respective one of opposite right and left edges of the front cross member 31, in a vehicle longitudinal direction, and a rear cross member 32 extending in the vehicle widthwise direction to couple respective rear portions of the side members 33, are provided, and the lower link 7 is swingably supported by the rear cross member 32. This provides an advantage of stably support a load input from the lower link 7 into the subframe 3, with a simple configuration.

In the above embodiment, each of the rubber bushes 21, 23 provided in the mounting portion 20 and the support portion 22 for the lower link 7 has a hardness set to a highest value, i.e., a first hardness, and each of the rubber bushes 17, 19 provided in the mounting portion 16 and the support portion 18 for the second lateral link 6 has a hardness set to a lowest value, i.e., a second hardness. Further, each of the rubber bushes 13, 15 provided in the mounting portion 12 and the support portion 14 for the first lateral link 5 has a hardness set to an intermediate value between the first hardness and the second hardness. Thus, the second lateral link 6 disposed below and frontward of the rotary shaft of the wheel can be most largely elastically deformed to allow a turning outer wheel to be more effectively displaced to a toe-in position during vehicle turning.

However, it is not essential to set hardness of each of the rubber bushes 13, 15, 17, 19, 21, 23 provided in the mounting portion 12 and the support portion 14 for the first lateral link 5, the mounting portion 16 and the support portion 18 for the second lateral link 6, and the mounting portion 20 and the support portion 22 for the lower link 7, in the above manner. For example, only the rubber bushes 13, 17, 21 provided in the mounting portion 12 for the first lateral link 5, and the mounting portion 16 for the second lateral link 6 and the mounting portion 20 for the lower link 7 may be designed to become different from each other in hardness. Conversely, only the rubber bushes 15, 19, 23 provided in the support portion 14 for the first lateral link 5, the support portion 18 for the second lateral link 6, and the support portion 22 for the lower link 7 may be designed to become different from each other in hardness. Even in these structures, it is possible to allow a turning outer wheel to be more effectively displaced to a toe-in position during vehicle turning.

As disclosed in the above embodiment, each of the side members 33 of the subframe 3 is provided with a pair of front and rear mount portions 45, 46 each adapted to be mounted to a rear side frame 11 of a vehicle body, wherein the side member 33 is connected to the front cross member 31 and the rear cross member, at a position where the side member 33 is concavedly curved inwardly with respect to the front and rear mount portions 44, 45 in the vehicle widthwise direction. For example, this provides an advantage of being able to adequately couple the rear side frame 11 and the side member 33 of the subframe 3 so as to effectively enhance the rigidity of the vehicle body, while ensuring a space for installing a coupling link 25 for the stabilizer 10 between the rear side frame 11 and the side member 33.

In the above embodiment, a shock absorber 8 is installed to extend downwardly, at a position rearward of the rotary shaft of the wheel, and a lower end of the shock absorber 8 is supported by the wheel carrying member 1, so that it becomes possible to sufficiently ensure an installation space of the shock absorber 8, by effectively utilizing a space formed on a rear side of the wheel carrying member 1 based on the arrangement where the first lateral link 5 is disposed frontward of the wheel carrying member 1. In addition, it is not necessary to change an installation position of the shock absorber 8 between a rear-wheel-drive or four-wheel-drive vehicle having a need for transmitting a driving force of an engine to rear wheels, and a front-wheel-drive vehicle free of the need for transmitting a driving force of an engine to rear wheels, so that it becomes possible to allow the suspension apparatus to have versatility as a rear-wheel suspension apparatus.

Particularly, as disclosed in the above embodiment, the shock absorber 8 is installed in a frontwardly-inclined posture by utilizing the space formed on the rear side of the wheel carrying member 1. For example, this provides an advantage of effectively enhance vehicle ride quality with a simple configuration, by using the shock absorber 8 as a damping member against up-and-down vibration input from the rear wheel suspension member 2, while effectively compactifying a installation space of the shock absorber 8.

An outline of the present invention based on the above embodiment:

The present invention provided a vehicle suspension apparatus which comprises: a wheel carrying member (1) adapted to rotatably carry a wheel; a pair of right and left wheel suspension members (2; 7) each including a lateral link (5, 6) having one end mounted to the wheel carrying member (1); a subframe (3) installed to couple the right and left wheel suspension members together; and a stabilizer (10), characterized in that the subframe (3) includes: a cross member (31) installed to extend in a vehicle widthwise direction and provided with a lateral-link support portion (14, 18) supporting the other end of the lateral link (5, 6); a pair of right and left side members (33) each extending from a respective one of opposite vehicle-widthwise outer ends of the cross member, in a vehicle longitudinal direction; and a pair of right and left reinforcing members (35) each reinforcing a coupling section between the lateral-link support portion (14, 18) of the cross member (31) or a vicinity thereof, and a respective one of the side members (33), and the stabilizer (10) is installed at a position higher than that of the cross member (31), wherein the stabilizer (10) has a stabilizer body (49) provided to extend in the vehicle widthwise direction, and a pair of right and left extension portions (50) each extending from a respective one of opposite right and left ends of the stabilizer body (49), in the vehicle longitudinal direction, and wherein: each of the reinforcing members (35) is provided with a stabilizer support section (47) rollably supporting a corresponding one of the right and left ends of the stabilizer body (49); and each of the extension portions (50) has a distal end coupled to a corresponding one of the right and left wheel suspension members (2; 7) through a coupling link (25).

In the present invention, the vehicle suspension apparatus is provided with the reinforcing members each reinforcing the coupling section between the lateral-link support portion of the cross member or the vicinity thereof, and a respective one of the side members, so that it becomes possible to effectively reinforce the coupling section between the lateral-link support portion provided in the cross member or the vicinity thereof, and the side member, so as to effectively improve rigidity of the subframe. In addition, the stabilizer (10) is installed at a position higher than that of the cross member, and has the stabilizer body (49) extending in the vehicle widthwise direction and the right and left extension portions (50) each extending from a respective one of the right and left ends of the stabilizer body (49), in the vehicle longitudinal direction. Further, each of the reinforcing members (35) is provided with the stabilizer support section rollably supporting a corresponding one of the right and left ends of the stabilizer body (49), and each of the extension portions (50) has a distal end coupled to a corresponding one of the right and left wheel suspension members (2; 7) through the coupling link (25), so that it becomes possible to stably support the stabilizer body to the cross member, and reduce a vehicle-widthwise offset amount (distance) between the stabilizer support section and the extension portion at each of the right and left ends of the stabilizer body. This makes it possible to efficiently transmit a load input into one of the wheel suspension members during vehicle turning, to the stabilizer body through the coupling link and the extension portion, so as to allow the stabilizer body to be reliably twisted so as to effectively produce a reaction force for suppressing a roll displacement of a vehicle body. In other words, the present invention has an advantage of being able to install the stabilizer at an adequate position so as to effectively bring out its function, with a simple configuration.

Preferably, as one embodiment of the present invention, the distal end of each of the extension portions (50) of the stabilizer (10) is locked to a corresponding one of the wheel suspension members (7) through the coupling link (25), at a vehicle-widthwise inner position with respect to the lateral-link support portion (14, 18). As above, the distal end of each of the extension portions of the stabilizer is locked to a corresponding one of the wheel suspension members through the coupling link (25), at a vehicle-widthwise inner position with respect to the lateral-link support portion of the cross member. This provides an advantage of being able to prevent the occurrence of a situation where the stabilizer support section and a lock portion for locking the stabilizer to the wheel suspension member, are largely offset in the vehicle widthwise direction, and sufficiently bring out the function of the stabilizer so as to effectively suppress the roll displacement of the vehicle body.

Preferably, each of the reinforcing members (35) has a front portion coupled to the cross member (31), a rear portion coupled to a corresponding one of the side members (33), and a top surface portion disposed in a posture inclined rearwardly and downwardly, wherein the stabilizer support section (47) is provided on the top surface portion of the reinforcing member (35). According to this feature, each of the reinforcing members has the front portion coupled to the cross member, the rear portion coupled to the side member, and a top surface portion disposed in a posture inclined rearwardly and downwardly, wherein the stabilizer support section is provided on the top surface portion of the reinforcing member. Thus, based on the reinforcing member disposed in the inclined posture, an effect of preventing tilting of the front cross member in the vehicle longitudinal direction can be improved to enhance an effect of reinforcing the coupling section between the front cross member and the side member. Further, based on providing the stabilizer support section on the inclined top surface portion of the reinforcing member, a dimension of an upwardly protruding portion of the stabilizer support section is reduced, so that the stabilizer can be compactly disposed.

Preferably, each of the wheel suspension members includes an upper lateral link (5) and a lower lateral link (6), wherein ends of the upper and lower lateral links (5, 6) on the side of the wheel carrying member (1) are supported, respectively, by an upper portion and a lower portion of the wheel carrying member (11) at positions frontward of a rotary shaft (S) of the wheel, and the upper and lower lateral-link support portions (12, 16) provided in the wheel carrying member (1) are disposed at approximately same positions in the vehicle longitudinal direction in side view. This provides an advantage of being able to obtain excellent suspension performance, and effectively enhance steering stability during vehicle turning, with a simple configuration.

Preferably, each of the side members (33) of the subframe (3) is provided with a pair of front and rear mount portions (44, 45) each adapted to be mounted to a rear side frame (11) of a vehicle body, wherein the side member (33) is connected to the cross member (31) at a position where the side member (33) is concavedly curved inwardly with respect to the front and rear mount portions (44,45) in the vehicle widthwise direction. According to this feature, each of the side members of the subframe is provided with the pair of front and rear mount portions each adapted to be mounted to a rear side frame of a vehicle body, wherein the side member is connected to the cross member at a position where the side member is concavedly curved inwardly with respect to the front and rear mount portions in the vehicle widthwise direction. For example, this provides an advantage of being able to adequately couple the rear side frame and the side frame so as to effectively reinforce the vehicle body, while ensuring a space for installing the coupling link for the stabilizer, etc., between the rear side frame and the side frame.

This application is based on Japanese Patent Application Serial No. 2010-150050 filed in Japan Patent Office on Jun. 30, 2010 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle suspension apparatus comprising: a wheel carrying member adapted to rotatably carry a wheel; a pair of right and left wheel suspension members each including a lateral link having one end mounted to the wheel carrying member; a subframe installed to couple the right and left wheel suspension members together; and a stabilizer, wherein the subframe includes:

a cross member installed to extend in a vehicle widthwise direction and provided with a lateral-link support portion supporting the other end of the lateral link;

a pair of right and left side members each extending from a respective one of opposite vehicle-widthwise outer ends of the cross member, in a vehicle longitudinal direction;

a pair of right and left reinforcing members each reinforcing a coupling section between the lateral-link support portion of the cross member or a vicinity thereof, and a respective one of the side members, and the stabilizer is installed at a position vertically higher than that of the cross member, the stabilizer having a stabilizer body provided to extend in the vehicle widthwise direction, and a pair of right and left extension portions each extending from a respective one of opposite right and left ends of the stabilizer body, in the vehicle longitudinal direction, and wherein:

each of the reinforcing members is provided with a stabilizer support section rollably supporting a corresponding one of the right and left ends of the stabilizer body;

each of the extension portions has a distal end coupled to a corresponding one of the right and left wheel suspension members through a coupling link; and the distal end of each of the extension portions of the stabilizer is locked to a corresponding one of the wheel suspension members through the coupling link, at a vehicle-widthwise inner position with respect to the lateral-link support portion.

2. The vehicle suspension apparatus as defined in claim 1, wherein each of the reinforcing members has a front portion coupled to the cross member, a rear portion coupled to a corresponding one of the side members, and a top surface portion disposed in a posture inclined rearwardly and downwardly, wherein the stabilizer support section is provided on the top surface portion of the reinforcing member.

3. The vehicle suspension apparatus as defined in claim 2, wherein each of the wheel suspension members includes an upper lateral link and a lower lateral link, wherein ends of the upper and lower lateral links on the side of the wheel carrying member are supported, respectively, by an upper portion and a lower portion of the wheel carrying member at positions frontward of a rotary shaft of the wheel, and the upper and lower lateral-link support portions provided in the wheel carrying member are disposed at approximately same positions in the vehicle longitudinal direction in side view.

4. The vehicle suspension apparatus as defined in claim 3, wherein each of the side members of the subframe is provided with a pair of front and rear mount portions each adapted to be mounted to a rear side frame of a vehicle body, wherein the side member is connected to the cross member at a position where the side member is concavedly curved inwardly with respect to the front and rear mount portions in the vehicle widthwise direction.

5. The vehicle suspension apparatus as defined in claim 2, wherein each of the side members of the subframe is provided with a pair of front and rear mount portions each adapted to be mounted to a rear side frame of a vehicle body, wherein the side member is connected to the cross member at a position where the side member is concavedly curved inwardly with respect to the front and rear mount portions in the vehicle widthwise direction.

6. The vehicle suspension apparatus as defined claim 1, wherein each of the wheel suspension members includes an upper lateral link and a lower lateral link, wherein ends of the upper and lower lateral links on the side of the wheel carrying member are supported, respectively, by an upper portion and a lower portion of the wheel carrying member at positions frontward of a rotary shaft of the wheel, and the upper and lower lateral-link support portions provided in the wheel carrying member are disposed at approximately same positions in the vehicle longitudinal direction in side view.

7. The vehicle suspension apparatus as defined in claim 6, wherein each of the side members of the subframe is provided with a pair of front and rear mount portions each adapted to be mounted to a rear side frame of a vehicle body, wherein the side member is connected to the cross member at a position where the side member is concavedly curved inwardly with respect to the front and rear mount portions in the vehicle widthwise direction.

8. The vehicle suspension apparatus as defined in claim 1, wherein each of the side members of the subframe is provided with a pair of front and rear mount portions each adapted to be mounted to a rear side frame of a vehicle body, wherein the side member is connected to the cross member at a position where the side member is concavedly curved inwardly with respect to the front and rear mount portions in the vehicle widthwise direction.

* * * * *